United States Patent [19]

Penney

[11] Patent Number: 4,535,357
[45] Date of Patent: Aug. 13, 1985

[54] VIDEO SIGNAL PROCESSING CIRCUIT AND METHOD FOR BLANKING SIGNAL INSERTION WITH TRANSIENT DISTORTION SUPPRESSION

[75] Inventor: Bruce J. Penney, Portland, Oreg.

[73] Assignee: Tektronix, Inc., Beaverton, Oreg.

[21] Appl. No.: 483,321

[22] Filed: Apr. 8, 1983

[51] Int. Cl.³ .............................................. H04N 5/06
[52] U.S. Cl. .................................... 358/150; 358/148; 358/319; 328/187
[58] Field of Search ............... 358/150, 153, 319, 148; 328/63, 187

[56] References Cited

U.S. PATENT DOCUMENTS 2,892,017  6/1959  Houghton ........................... 358/319
4,122,477  10/1978 Gallo .................................. 358/150
4,213,149  7/1980  Janko ................................. 358/319

Primary Examiner—Tommy P. Chin
Assistant Examiner—Michael D. Parkes
Attorney, Agent, or Firm—John Smith-Hill

[57] ABSTRACT

A video signal processing circuit and method for the insertion of a blanking data signal including blanking pulse, horizontal sync and color burst signal components into an input video signal to provide a modified video signal. The modified video signal is subjected to signal shaping to reduce the slopes of the front and rear edges of the blanking pulse portion in order to suppress transient overshoot and ringing distortion when the resultant output video signal is transmitted through a low pass filter. The signal shaping is preferably provided by a voltage controlled amplifier whose gain control terminal is connected to a control voltage which varies during the blanking pulse and is provided at the output of a slew limited amplifier or a non-linear low pass filter with a sine squared pulse response. The input of the slew limited amplifier is connected to an electronic switch operated by a timing circuit for selectively switching between different gain voltage sources. The timing circuit also applies a switching signal to another electronic switch providing a blanking data insertion means which selectively applies the input video signal or the blanking data signal to the input of the voltage controlled amplifier. An analog to digital converter can be employed to convert the input video signal to a digital signal for storage in a memory and further processing before insertion of digital blanking data.

18 Claims, 4 Drawing Figures

VIDEO SIGNAL PROCESSING CIRCUIT AND METHOD FOR BLANKING SIGNAL INSERTION WITH TRANSIENT DISTORTION SUPPRESSION

BACKGROUND OF INVENTION

The present invention relates generally to video signal processing by the insertion of a separately generated blanking data signal including blanking pulse, horizontal sync and, in the case of color television video signals, color burst signal components, into an input video signal without the introduction of transient signal distortion. In particular, the invention is directed to such a video signal processing circuit and method employing a signal shaping means for reducing the slopes of the front and rear edges of the blanking pulse portion to enable the modified video signal produced after insertion of the blanking data signal to be transmitted through a low pass filter without transient overshoot and ringing distortion of the output video signal. The video signal processing circuit of the present invention is especially useful in a television frame synchronizer or a television timebase correction system.

A television signal processor employing a separately generated digital blanking data signal which is inserted into a digital input video signal for greater accuracy and less distortion of the horizontal sync and color burst components of such blanking data, is described in the article "Digital Processing In the DPS-1" by J. Lowry et al in *Society of Motion Picture and Television Engineers Digital Video*, Volume 2, pages 43–63 published March 1979. Previous television frame synchronizer circuits employing digital techniques for the insertion of separately generated digital blanking data signals have the disadvantage that they introduce transient distortion including overshoot and ringing in the blanking pulse portion of the output video signal. The video signal processing circuit of the present invention overcomes this problem.

The video signal processing circuit and method of the present invention provides an externally generated blanking data signal which is inserted into the input video signal to provide more accurate horizontal sync and color burst signal components by replacing these signal components in the input video signal. The blanking data signal may be a digitally generated blanking data signal which is inserted into a digital input video signal produced when the analog input video signal is transmitted through an analog to digital converter and a digital processor circuit with memory. The resulting modified video signal is then transmitted through a signal shaping circuit such as a voltage controlled amplifier which reduces the slope of the front and rear edge portions of the blanking pulse portion to provide a shaped video signal which is transmitted through a low pass filter without transient signal distortion such as ringing and overshoot of the output video signal as is produced by prior digital blanking data insertion circuits. Thus, the step transition times of the front and rear edges of the blanking pulse portion of the video signal are increased so that they are greater than the period of the upper limit frequency of the low pass filter, in order to prevent such transient signal distortion of the output video signal.

The control voltage terminal of the voltage controlled amplifier used to shape the video signal may be connected to the output of a slew limited amplifier, such as that shown in U.S. Pat. No. 4,163,948 issued Aug. 7, 1979 to M. L. Rieger et al, or the output of a low pass filter with a sine squared pulse response such as that described in the article "A New Sine-Squared Pulse and Bar Shaping Network" by A. Kastelein from *IEEE Transactions of Broadcasting*, pages 84–89 Volume BC-16, No. 4, December 1980. The input of the slew limited amplifier or the low pass filter with sine squared response is selectively connected by an electronic switch to different gain control voltages including a blanking gain voltage source which is applied when the blanking data signal portion is received at the input of the voltage control amplifier.

SUMMARY OF THE INVENTION

One object of the present invention is to provide an improved video signal processing circuit and method for the insertion of an externally generated blanking data signal into an input video signal to provide more accurate horizontal sync and color burst signal components in the output video signal without transient signal distortion of such output video signal.

Another object of the invention is to provide such a video signal processing circuit and method including signal shaping for reducing the slope of the front and rear edges of the blanking pulse portion of the video signal sufficiently to prevent transient signal distortion when such shaped video signal is transmitted through a low pass filter A further object of the invention is to provide such a video signal processing circuit in which the signal shaping of the video signal is provided by a voltage controlled amplifier whose control terminal is connected to a source of variable control voltage for properly shaping the slopes of the front and rear edge portions of the blanking pulse portion in a predetermined accurate manner.

An additional object of the invention is to provide such a video signal processing circuit in which the control terminal of the voltage controlled amplifier is connected to a slew limited amplifier whose input is selectively connected to a blanking gain voltage source when the blanking pulse portion of the video signal is applied to the input of the voltage controlled amplifier for more accurate shaping of the blanking pulse portion without adversely effecting the waveform of the horizontal sync and color burst components or the active video portion of the video signal.

Still another object of the invention is to provide such a video signal processing circuit and method for inserting an externally generated digital blanking data signal into a digital input video signal and for shaping the modified video signal to reduce the slope of the front and rear edge portions of the blanking pulse portion of the video signal so that their transition time is greater than or at least substantially equal to the period of the upper limit frequency of a low pass filter through which the shaped video signal is transmitted in order to prevent transient signal distortion of the output video signal.

A still further object of the invention is to provide an improved video data signal processing method for the insertion of an externally generated blanking data signal into a video input signal and for shaping the resultant modified video signal to reduce the slopes of the front and rear edge portions of the blanking pulse before such video signal is transmitted through a low pass filter in order to prevent overshoot and ringing distortion of the output video signal.

DESCRIPTION OF DRAWINGS

Other objects and advantages of the present invention will be apparent from the following detailed description of a preferred embodiment thereof and from the attached drawings of which.

DESCRIPTION OF PREFERRED EMBODIMENTS

Figure 1:
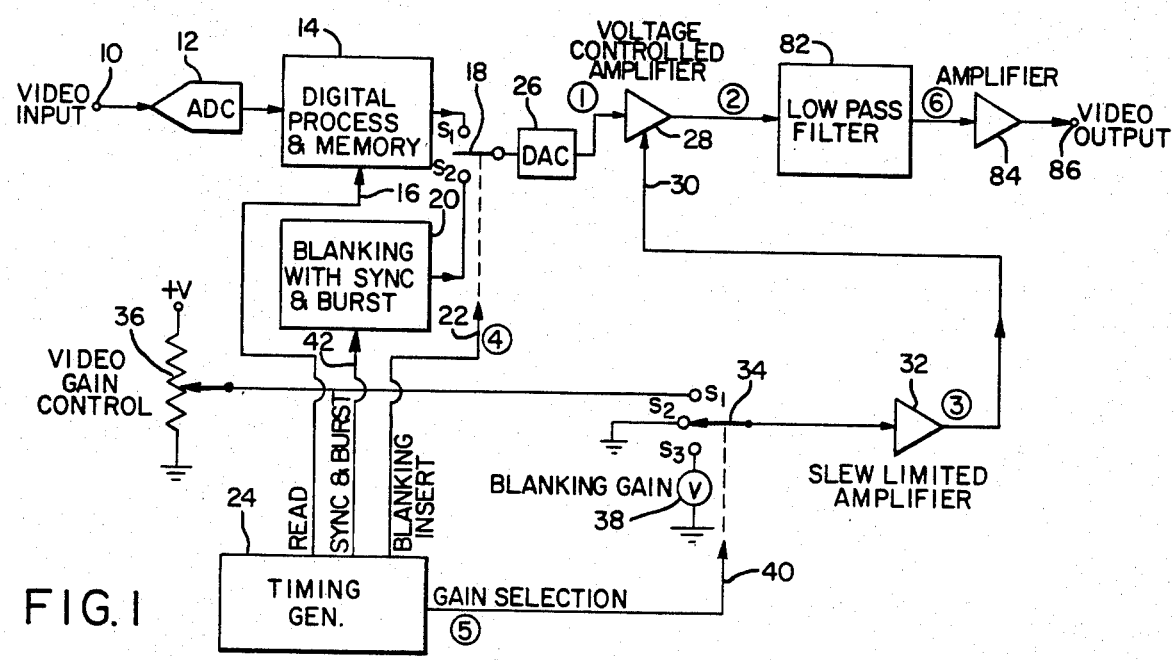
FIG. 1 is a block diagram of one embodiment of a video signal processing circuit providing blanking data insertion in accordance with the present invention.

A video signal processing circuit in accordance with the present invention is shown in FIG. 1. An analog input video television signal is applied to an input terminal 10 which is connected to the input of an analog to digital converter 12. The analog to digital converter converts the analog input video signal into a digital input video signal which is applied to a digital processor circuit 14 containing a digital memory for storing and processing such digital video signal. A read signal applied to the read input 16 of the digital processor circuit causes the digital input video signal to be read out of the memory and transmitted from the output of the digital processing circuit 14 to one input terminal of a two-position electronic switch 18. The other input terminal of the switch 18 is connected to a blanking data source 20 which externally generates a digital blanking data signal including blanking pulse, horizontal sync and, in the case of color television video signals, color burst signal components. The blanking data signal may be an analog signal if it is to be inserted in an analog input video signal, but is a digital signal preferably and is inserted into the digital input video signal by switching the movable contact of the switch 12 into the lower position when a blanking insert signal is applied to a switch control output 22 of a timing signal generator circuit 24 connected to such switch. The timing circuit 24 also produces the read signal applied to the read input 16 of the digital processor circuit 14.

The electronic switch 18 functions as a signal insertion means for insertion of the digital blanking data signal from source 20 into the digital input video signal produced at the output of the digital processor circuit 14 to provide a modified video signal. This modified video signal is applied to the input of a digital to analog converter 26 which converts the digital modified video signal into an analog signal and applies the analog modified video signal to the input of a voltage controlled amplifier 28.

The voltage controlled amplifier 28 acts as a signal shaping means for shaping the modified video signal by reducing the slopes of the front edge and the rear edge of the blanking pulse portion of the modified video signal. As a result, such edges are no longer vertical transitions, but have transition times which are greater than or at least substantially equal to the period of the upper cutoff frequency of the low pass filter connected to the output of such amplifier to prevent transient distortion as hereafter described. A gain control terminal 30 of the voltage control amplifier 28 is connected to the output of a slew limited amplifier 32 whose input is connected through a gain selector switch 34 to three different D.C. voltage sources. The slew limited amplifier may be of the type shown in U.S. Pat. No. 4,163,948 issued Aug. 7, 1979 to M. L. Rieger. Thus, the gain selector switch 34 is a three-position electronic switch having a first terminal S1 connected to the movable contact of a potentiometer 36 whose end terminals are connected between a +V positive D.C. voltage source and ground to provide a video gain control for varying the gain of the active video or T.V. picture signal portion of the modified video signal applied to the input of the voltage control amplifier 28. The second terminal S2 of the gain selector switch 34 is connected to ground to apply zero volts to the input terminal of the slew limited amplifier 32 for a zero gain setting of the voltage controlled amplifier 28. The third terminal S3 of such switch is connected to a blanking gain voltage source 38 which applies a fixed voltage to the input terminal of the slew limited amplifier 32 which sets a gain of about one for the voltage controlled amplifier when the blanking data portion of the modified video signal is applied thereto, in a manner hereafter described with respect to FIG. 2. The gain selector switch 34 is switched between the three switch position S1, S2 and S3 by a gain selector signal at output 40 of the timing generator circuit 24.

It should be noted that the slew limited amplifier 32 may be replaced by a low pass filter with sine squared pulse response such as the type shown in the above-referenced article by A. Kastelein. The voltage controlled amplifier 28 may be of a conventional type or it may be similar to that described in the article "A Four-Quadrant Analog Divider/Multiplier with 0.01% Distortion" by Barry Gilbert, published in *Digest of Technical Papers of* 1983 *IEEE International Solid State Circuits Conference,* pages 248 and 249 published Feb. 25, 1983. However, any other suitable voltage controlled amplifier can be employed whose gain varies in a predetermined manner dependent upon the voltage applied to the control terminal 30 of such amplifier.

The timing signal generator 24 generates a horizonal sync and color burst timing signal at output 42 which is applied to the blanking data circuit 20 to cause such circuit to generate the blanking data signal. The blanking data signal includes the blanking pulse, the horizontal sync and the color burst signal components which are inserted into the input video signal by the signal insertion switch 18 in the lower position of such switch. Thus, the sync and burst timing signal at output 42 is properly timed with respect to the blanking insert timing signal at output 22 and the gain selection signal at output 40 as well as the read output signal 16 of the timing generator 24 for proper operation of the video signal processing circuit of the present invention.

Figure 2:
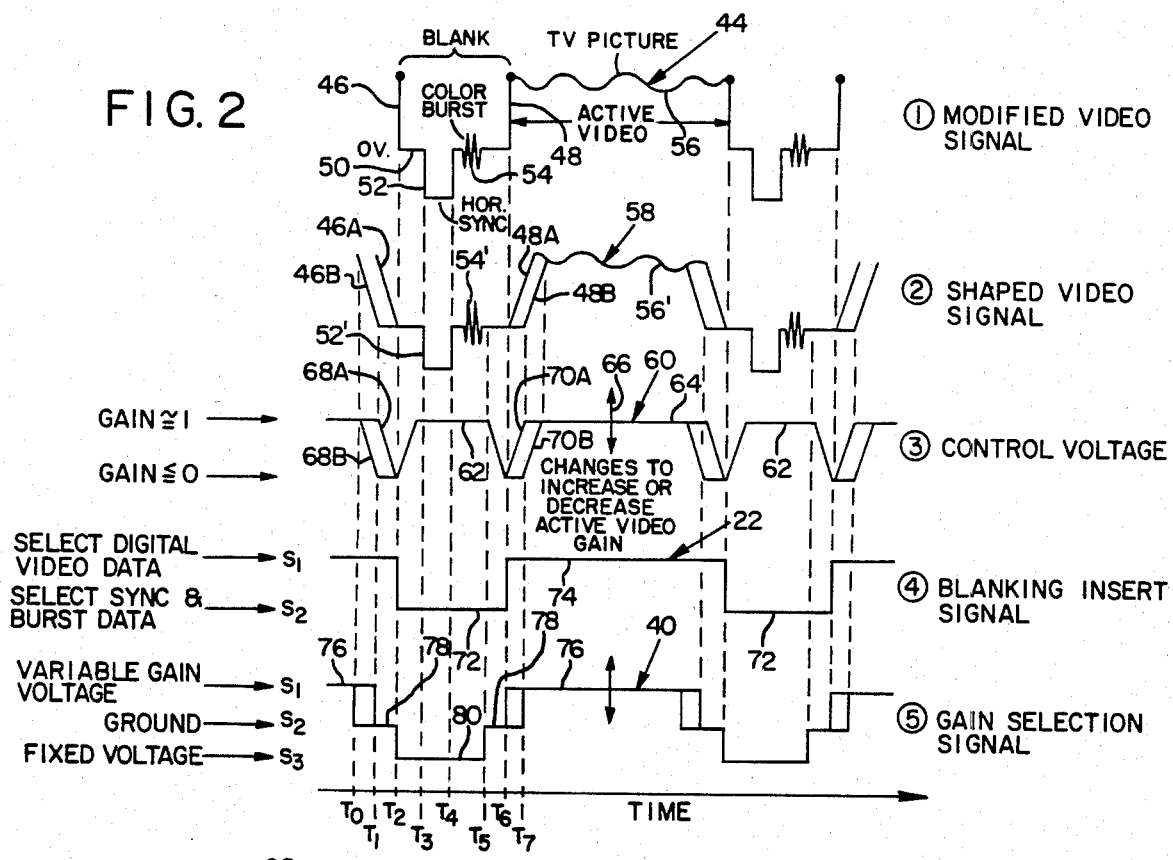
FIG. 2 is a diagram of the electrical signal waveforms produced in the circuit of FIG. 1 shown on a common time axis.

The operation of the circuit of FIG. 1 will be apparent from the waveforms of the signals produced therein which are shown in FIG. 2. These signals include a modified video signal 44 produced at the output of the digital to analog converter 26 as indicated by reference number 1 on FIG. 1. The modified video signal 44 includes a blanking data portion comprised of a negative rectangular blanking pulse having a front edge 46 and a rear edge 48, and a minimum amplitude voltage level 50 of approximately zero volts which blanks or cuts off the cathode ray tube of the television receiver for horizontal line retrace during such blanking pulse. A horizontal sync pulse 52 in the form of a negative rectangular pulse is added to the blanking pulse to further reduce the amplitude thereof during the width of such sync pulse. A color burst signal component 54 in the form of a high frequency sine wave is added to the "back porch" portion of the blanking pulse immediately following the horizontal sync pulse 50 in the case of a conventional video color television signal. It should be noted that the blanking data signal portion exists between the front edge 46 and the rear edge 48 of the blanking pulse and is followed by a positive-going active video signal portion 56 containing the television picture signal components which has a much greater amplitude than the 0 volts level 50 so that the cathode ray tube is unblanked or turned on condition to display such active video signal portion.

A shaped video signal 58 is produced at the output of the voltage controlled amplifier 28, as indicated by reference number 2 at the output thereof. The shaped video signal 58 is similar to the modified video signal 44 in the timing position and waveform shape of the horizontal sync pulse 52', the color burst signal component 54', and the active video signal portion 56'. However, the front edge 46A and the rear edge 48A of the blanking pulse portion of the shaped video signal 58 are of reduced slope from the vertical step transitions forming the front edge 46 and the rear edge 48 of the blanking pulse portion of the modified video signal 44. This reduction in the slope of the front and rear edges 46A and 48A of the blanking pulse portion is due to the change in gain of the voltage controlled amplifier 28 by control voltage signal 60 produced at output 3 of the slew limited amplifier 32 when the selector switch 34 connects the input of the slew limited amplifier through the third switch terminal S3 to the blanking gain voltage source 38 during the time period between $T_2$ to $T_5$ of the gain selection signal 40 of FIG. 2. Thus, the gain control signal 60 produced at the output of the slew limited amplifier 32 and applied to the control terminal 30 of the voltage controlled amplifier 28 provides such voltage controlled amplifier with a constant gain of approximately one during portion 62 of the blanking data signal when the horizontal sync pulse 52 and the color burst 54 are produced, and also provides a constant gain of approximately one during portion 64 corresponding to the active video signal portion 56' of the shaped video signal. However, it should be noted that the voltage of the gain control signal portion 64 may be increased or decreased relative to the voltage of portion 62 depending upon the required amplitude of the active video signal portion 56', and this variation of voltage is indicated by the double headed arrow 66.

The voltage of the control signal as shown at 68A from a value corresponding to a gain of one to a value corresponding to a gain of zero during the time period $T_1$ to $T_2$ immediately preceding the front edge 46 of the blanking pulse of the modified video signal 44 resulting in a lower sloped front edge 46A of the shaped video signal 58. It should be noted that even though the gain increases from 0 to 1 during the time period $T_2$ to $T_3$ from the end of the control signal portion 68A to the beginning of control portion 62, there is no change in the voltage of the corresponding portion of the shaped video signal 58 during this time because of the fact that the blanking pulse amplitude 50 is zero volts for the modified signal 42, so there is no amplification at such time. The control voltage signal 60 reduces the gain of the amplifier 28 from one to zero during time period $T_5$ to $T_6$ from the end of portion 62 to the beginning of control voltage portion 70A, but here again, there is no change in the amplitude of the shaped video signal 58 during this time because the modified video signal 44 is then at zero volts. However, as the control voltage increases during time period $T_6$ to $T_7$, as shown by signal portion 70A, the rear edge 48 of the blanking pulse is reduced in slope to provide waveform portion 48A of the shaped video signal. As a result of these changes in gain, the shaped video signal 58 is produced at the output of the voltage controlled amplifier 28. It should be noted that for a wider blanking pulse interval, the shaped video signal portions 46B and 48B are produced in response to the changes in the control voltage during signal portions 68B and 70B, respectively.

The blanking insert signal 22 applied to the blanking data signal insertion switch 18 is produced with a negative-going rectangular pulse portion 72 during time period $T_2$ to $T_6$ corresponding to the blanking data signal including horizontal sync and color burst components which is equal in width to the blanking pulse portion bounded by edges 46 and 48. The blanking insert signal 22 also includes a select digital video data portion 74 which is a positive-going rectangular signal corresponding to the time period of the active video portion 56 of the modified video signal 44. Similarly, the gain selection signal 40 applied to the selector switch 34 includes a variable gain portion 76 corresponding to the switch position S1 and to the setting of the video gain control potentiometer 36. In addition, the gain selection signal 40 includes a ground voltage level 78 at switch position S2 of the selector switch 34. The ground voltage gain selection signal level 78 between times $T_1$ and $T_2$ corresponds to control voltage portion 68A in which the gain reduces from 1 to 0 in the control voltage 60, and level 78 between the time $T_5$ to $T_6$ corresponds to the gain reduction from 1 to 0 between the end of signal portion 62 and the start of portion 70A. When this gain selection signal 40 increases the time of ground voltage level 78 to the time period $T_0$ to $T_2$ and the time period $T_5$ to $T_7$, the control voltage 60 is widened to add portion 68B and the 0 gain portion prior to portion 70B. This in turn widens the shaped video signal 58 to produce edge portions 46B and 48B rather than edge portions 46A and 48A. Finally, the gain selection signal 40 also includes a fixed voltage portion 80 at the third switch position S3 corresponding to the voltage of the blanking gain voltage source 38. It should be noted that the corresponding portions of the signals 44, 58, 64, 22 and 40 are in vertical time alignment in FIG. 2 as indicated by vertical dashed lines at the times $T_0$ to $T_7$, and are maintained in this time relationship for proper operation of the circuit of FIG. 1.

Figure 3A:
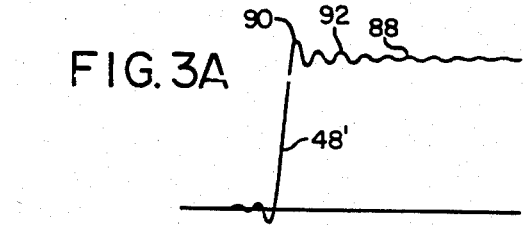
FIGS. 3A and 3B show the blanking pulse transition of an output video signal transmitted through the low pass filter of the circuit of FIG. 1 without using and after using the signal shaping circuit of the present invention.
Figure 3B:
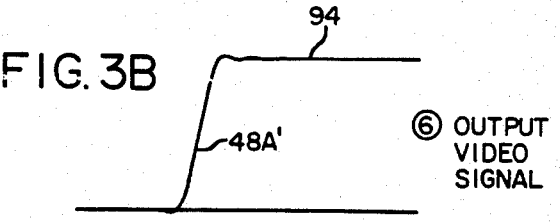

The shaped video signal 58 produced at the output of the voltage controlled amplifier 28 is transmitted through a low pass filter 82 and through an output amplifier 84 to an output terminal 86 from which the output video signal is transmitted. As shown in FIG. 3A, a distorted output video signal 88 corresponding to the rear edge 48 of the blanking pulse portion of the modified video signal 44 is produced with transient distortion including overshoot 90 at the top of its leading edge and ringing distortion 92 along the top of such output signal at the output of the low pass filter 82 when applying the modified video signal directly to such low pass filter without first transmitting it through the voltage controlled amplifier 28 for signal shaping in the manner of the present invention. In contrast, an undistorted video output signal 94 corresponding to the rear edge 48A of the blanking pulse portion of the shaped video signal 58 is produced at the output of the low pass filter and at output terminal 86 when the shaped video signal produced in accordance with the present invention is applied to the input of the low pass filter 82. Thus, it can be seen that the undistorted video output signal 94 has suppressed transient distortion with substantially no overshoot or ringing distortion in its waveform. When the low pass filter has a high frequency cutoff of about 4.0 megahertz, corresponding to a period of 250 nanoseconds, the slopes of the front edge 46A and the rear edge 48A of the blanking pulse portion of the shaped video signal 58 must be reduced so that the step transition time of such edges is greater than or at least substantially equal to 250 nanoseconds, in order to prevent transient signal distortion. Similarly, when a low pass filter is used having an upper cutoff frequency of 7.0 megahertz, corresponding to a period of 140 nanoseconds, the transition time of the front edge 46A and the rear edge 48A of the blanking pulse portion of the shaped video signal 58 must be greater than or at least substantially equal to 140 nanoseconds in order to prevent such transient signal distortion.

It will be obvious to those having ordinary skill in the art that many changes may be made in the preferred embodiment of the present invention without departing from the spirit of the invention. For example, the blanking data signal source 20 can be an analog signal source to provide an analog blanking data signal which is inserted into an analog input video signal, in which case the analog to digital converter 12, the digital processing circuit 14 and the digital to analog converter 26 can be eliminated. Alternatively, the voltage controlled amplifier 28 may be employed as a digital signal shaping amplifier having its output connected to the input of the digital to analog converter 26. Therefore, the scope of the present invention should only be determined by the following claims.

I claim:

1. A video signal processing circuit comprising:
video input means for supplying an input video signal;
blanking data means for generating a separate blanking data signal including blanking pulse and horizontal sync signal components;
signal insertion means for inserting said blanking data signal into said input video signal to provide a modified video signal; and
signal shaping means for shaping a portion of the modified video signal to reduce the slopes of the front and rear edges of the blanking pulse portion to provide a shaped video signal, and to enable the transmission of the shaped video signal through a low pass filter to provide an output video signal and to suppress transient distortion of said output video signal.

2. A circuit in accordance with claim 1 in which the blanking data means supplies a digital blanking data signal and which includes an analog to digital converter means for converting the input video signal to a digital signal before the blanking data signal is inserted therein.

3. A circuit in accordance with claim 2 in which the signal shaping means includes a voltage controlled amplifier whose control terminal is connected to a control voltage signal source whose amplitude varies in a predetermined manner.

4. A circuit in accordance with claim 3 in which the control voltage signal source is a slew limited amplifier.

5. A circuit in accordance with claim 3 which also includes a digital to analog converter, and in which the modified video signal is transmitted through the digital to analog converter to provide a modified analog video signal which is applied to the input of the voltage controlled amplifier.

6. A circuit in accordance with claim 1 which also includes a low pass filter means connected to the output of said signal shaping means, said filter means having a high frequency cutoff whose period is less than or at least substantially equal to the step response times of the shaped front and rear edges of the blanking pulses.

7. A circuit in accordance with claim 1 which also includes first electronic switch means for switching the signal shaping means to reduce the slope of said edge portions in response to the receipt of a gain selection signal by said first switch means.

8. A circuit in accordance with claim 7 which also includes second electronic switch means for switching the signal insertion means to insert said blanking data signal in response to the receipt of a blanking insert signal by said second switch means.

9. A circuit in accordance with claim 2 which also includes a digital signal processing means connected between the output of said analog to digital converter and said signal insertion means, said signal processing means including memory means for storing and processing the digital input video signal before the digital data signal is inserted therein.

10. A circuit in accordance with claim 1 in which the input video signal is a color television signal and the blanking data signal also includes a color burst component.

11. A method of processing a video signal, comprising:
supplying an input video signal;
generating a blanking data signal separate from said input video signal, said blanking data signal including blanking pulse and horizontal sync signal components;
inserting said blanking data signal into said input video signal to provide a modified video signal;
shaping a portion of the modified video signal to reduce the slopes of the front and rear edges of the blanking pulse portion to provide a shaped video signal; and
transmitting said shaped video signal through a low pass filter having a high frequency cutoff whose period is less than or at least substantially equal to the step response times of the shaped front and rear edges of the blanking pulses, to provide an output video signal and to suppress transient distortion of said output video signal.

12. A method in accordance with claim 11 in which the blanking data signal is a digital signal and the input video signal is converted from an analog to a digital input video signal before insertion of the digital blanking data signal therein.

13. A method in accordance with claim 11 in which the modified video signal is shaped by transmitting it through a voltage controlled amplifier and varying the gain of said amplifier in response to a control voltage which varies in a predetermined manner.

14. A method in accordance with claim 13 in which the control voltage decreases from a fixed gain to zero gain to shape the front edge and increases from zero gain to said fixed gain to shape the rear edge of the blanking pulse portion of the shaped video signal.

15. A method in accordance with claim 12 in which the digital input video signal is stored in a digital memory and is read out of such memory before the digital blanking data is inserted therein.

16. A method in accordance with claim 11 in which the input video signal is a color television signal and the blanking data signal also includes a color burst component.

17. A video signal processing circuit comprising:
video input means for supplying an input video signal having a horizontal blanking interval and an active video interval;
blanking data means for generating a separate blanking data signal including blanking level and horizontal sync signal components;
signal insertion means for inserting said blanking data signal into the horizontal blanking interval of said input video signal; and
signal shaping means for shaping the video signal to provide, at the beginning and end of the active video interval, a limited slew transition between the blanking level and the level of the video signal between the beginning and end of the active video interval, and to enable the transmission of the shaped video signal through a low pass filter to provide an output video signal and to suppress transient distortion of said output video signal.

18. A method of processing a video signal, comprising:
supplying an input video signal having a horizontal blanking interval and an active video interval;
generating a blanking data signal separate from said input video signal, said blanking data signal including blanking level and horizontal sync signal components;
inserting said blanking data signal into the horizontal blanking interval of said input video signal;
shaping the video signal to provide, at the beginning and end of the active video interval, a limited slew transition between the blanking level and the level of the video signal between the beginning and end of the active video interval; and
transmitting the shaped video signal through a low pass filter having a high frequency cut off whose period is less than or at least substantially equal to the step response times of the limited slew transitions, to provide an output video signal and to suppress transient distortion of said output video signal.

* * * * *